(12) United States Patent
Wagner et al.

(10) Patent No.: US 8,889,318 B2
(45) Date of Patent: Nov. 18, 2014

(54) FUEL CELL STACK THAT PROMOTES GENERALLY UNIFORM FLOW THEREIN

(75) Inventors: Thomas Alan Wagner, Ann Arbor, MI (US); Ronald David Brost, Dearborn, MI (US); Shinichi Hirano, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 776 days.

(21) Appl. No.: 12/777,678

(22) Filed: May 11, 2010

(65) Prior Publication Data

US 2011/0165500 A1 Jul. 7, 2011

(51) Int. Cl.
*H01M 4/64* (2006.01)
*H01M 8/02* (2006.01)
*B60L 11/18* (2006.01)
*H01M 8/10* (2006.01)

(52) U.S. Cl.
CPC .......... *H01M 8/026* (2013.01); *Y02T 90/16* (2013.01); *H01M 8/0258* (2013.01); *Y02T 90/34* (2013.01); *B60L 11/1881* (2013.01); *H01M 2250/20* (2013.01); *H01M 2008/1095* (2013.01); *B60L 11/1883* (2013.01); *Y02T 90/32* (2013.01); *B60L 11/1892* (2013.01); *Y02E 60/50* (2013.01)
USPC ........................................................ 429/518

(58) Field of Classification Search
CPC ... H01M 4/64; H01M 4/8631; H01M 8/0258; H01M 8/026; H01M 8/0202; H01M 2/14; H01M 2004/029
USPC ............ 429/443–444, 446–449, 452, 545, 429/456–461, 463–467, 469–471, 479, 429/482–483, 497, 498, 507–508, 511, 429/512–516, 518, 535
See application file for complete search history.

(56) References Cited

U.S. PATENT DOCUMENTS

| 6,413,664 B1 * | 7/2002 | Wilkinson et al. ............ 429/457 |
| 7,067,213 B2 | 6/2006 | Boff et al. |

(Continued)

FOREIGN PATENT DOCUMENTS

| CN | 201167109 Y | 12/2008 | |
| JP | 09050817 A * | 2/1997 | ............... H01M 8/02 |
| JP | 2004207160 A * | 7/2004 | ............... H01M 8/02 |

OTHER PUBLICATIONS

Machine Translation and Abstract in English of JP 09-050817.*

(Continued)

*Primary Examiner* — Maria J Laios
*Assistant Examiner* — Claire L Roe
(74) *Attorney, Agent, or Firm* — Damian Porcari; Brooks Kushman P.C.

(57) ABSTRACT

A power generating system may include a plurality of bipolar plates stacked to form a fuel cell assembly having an inlet side, a non-inlet side, an inlet header extending from the inlet side to the non-inlet side, an active area, and an inlet transition area. The inlet transition area may be in fluid communication with (i) the inlet header via feed passageways formed in each of the plates and (ii) the active area. The feed passageways of the plates located proximate to the inlet side may be generally smaller and/or fewer in number than the feed passageways of the plates located proximate to the non-inlet side such that, during operation of the fuel cell assembly, a flow velocity of gas through the active area is generally constant.

14 Claims, 11 Drawing Sheets

(56) References Cited

U.S. PATENT DOCUMENTS

2003/0108782 A1* 6/2003 Leger et al. ............. 429/30
2004/0265675 A1 12/2004 Woodcock et al.
2005/0118489 A1* 6/2005 Frederiksen et al. ........ 429/38
2006/0065520 A1 3/2006 Ballantine et al.
2006/0234107 A1 10/2006 Leger et al.
2006/0292408 A1* 12/2006 Suh et al. ............. 429/19
2007/0178359 A1* 8/2007 Peng et al. ............. 429/38
2009/0186253 A1 7/2009 Trabold et al.

OTHER PUBLICATIONS

Machine Translation and Abstract in English of JP 2004-207160.*
J. Cooper, Design Analysis of PEMFC Bipolar Plates Considering Stack Manufacturing and Environment Impact, Department of Mechanical Engineering, University of Washington, Seattle, WA 98195, Nov. 1, 2003.
R. Boddu, et al., Development of Bipolar Plates With Different Flow Channel Configurations for Fuel Cells, 2009 Elsevier B.V.

* cited by examiner

FUEL CELL STACK THAT PROMOTES GENERALLY UNIFORM FLOW THEREIN

BACKGROUND

Uniform gas and coolant distribution may improve the performance of proton exchange membrane fuel cell systems while reducing balance of plant requirements. As the number of cells in a stack increases, however, creating uniform gas flow conditions throughout the stack may become difficult. Gas flow variation in a 400 cell fuel cell stack, for example, may cause lower gas velocities in some cells and higher gas velocities in other cells. The reduced flow in some cells may result in lower current densities or cell flooding. Similarly, excessive flow can also lead to durability concerns within the fuel cell stack.

SUMMARY

A fuel cell system may include a plurality of bipolar plates stacked to form a fuel cell assembly having an inlet side, a non-inlet side, an inlet header extending from the inlet side to the non-inlet side, and an inlet transition area. The inlet transition area may be in fluid communication with the inlet header via feed passageways formed in each of the plates. The feed passageways of the plates located proximate to the inlet side may be configured to restrict the flow of gas therethrough, during operation of the fuel cell assembly, relative to the flow of gas through the feed passageways of the plates located proximate to the non-inlet side.

Numbered elements of the Figures that differ by multiples of 100 may have similar, although not necessarily identical, descriptions. As an example, elements 12, 112, 212, etc. may share similar descriptions.

DETAILED DESCRIPTION

Figure 1:
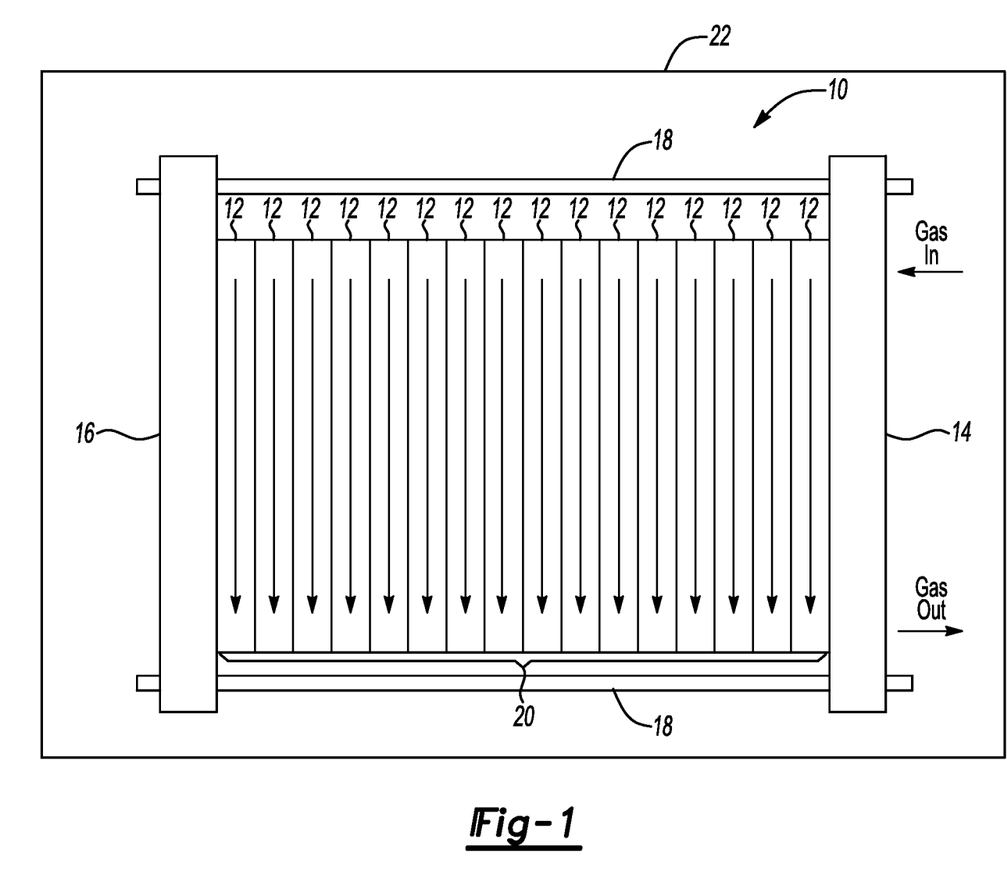
FIG. 1 is a side view of a fuel cell assembly.

Referring to FIG. 1, a fuel cell assembly 10 may include a plurality of stacked bipolar fuel cell plates 12, end plates 14, 16, and clamps 18. The stacked fuel cell plates 12 form a fuel cell stack 20. The end plate 14 includes inlet and outlet ports (not shown). The side of the fuel cell stack 20 next to the end plate 14 may be referred to as the inlet side. The side of the fuel cell stack 20 next to the end plate 16 may be referred to as the non-inlet side.

Gases, such as hydrogen and air, enter the fuel cell stack 20 via the inlet ports and exit the fuel cell stack 20 via the outlet ports (as indicated by arrow). Coolant also enters the fuel cell stack 20 via one of the inlet ports and exits the fuel cell stack 20 via one of the outlet ports.

As known in the art, electrical energy may be generated by the fuel cell stack 20 as the hydrogen and oxygen react. This electrical energy may be used to power various electrical devices and/or stored within an energy storage unit.

The fuel cell stack 20 of FIG. 1, for example, is configured to provide motive power for a vehicle 22. That is, the fuel cell stack 20 is electrically connected in a known fashion with an electric machine (not shown) that converts electrical energy generated by the fuel cell stack 20 to mechanical energy used to move the vehicle 22. Alternatively, the fuel cell stack 20 may be electrically connected with a battery (not shown) as mentioned above to store electrical energy generated by the fuel cell stack 20. An electric machine may be configured in a known fashion to draw electrical energy from the battery to produce mechanical energy used to move the vehicle 22. Other arrangements are, of course, also possible.

Figure 2:
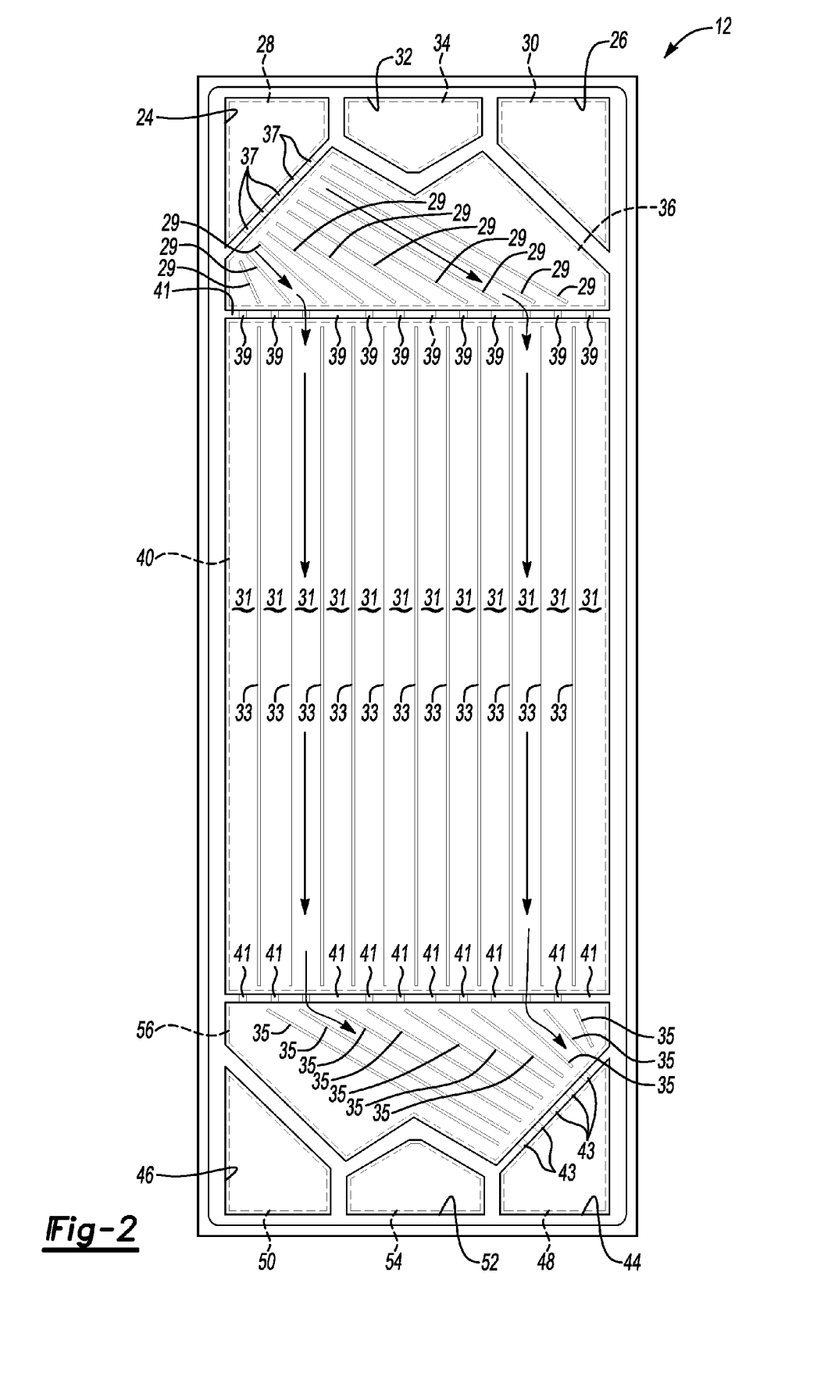
FIG. 2 is a front view of a bipolar fuel cell plate.
Figure 3:
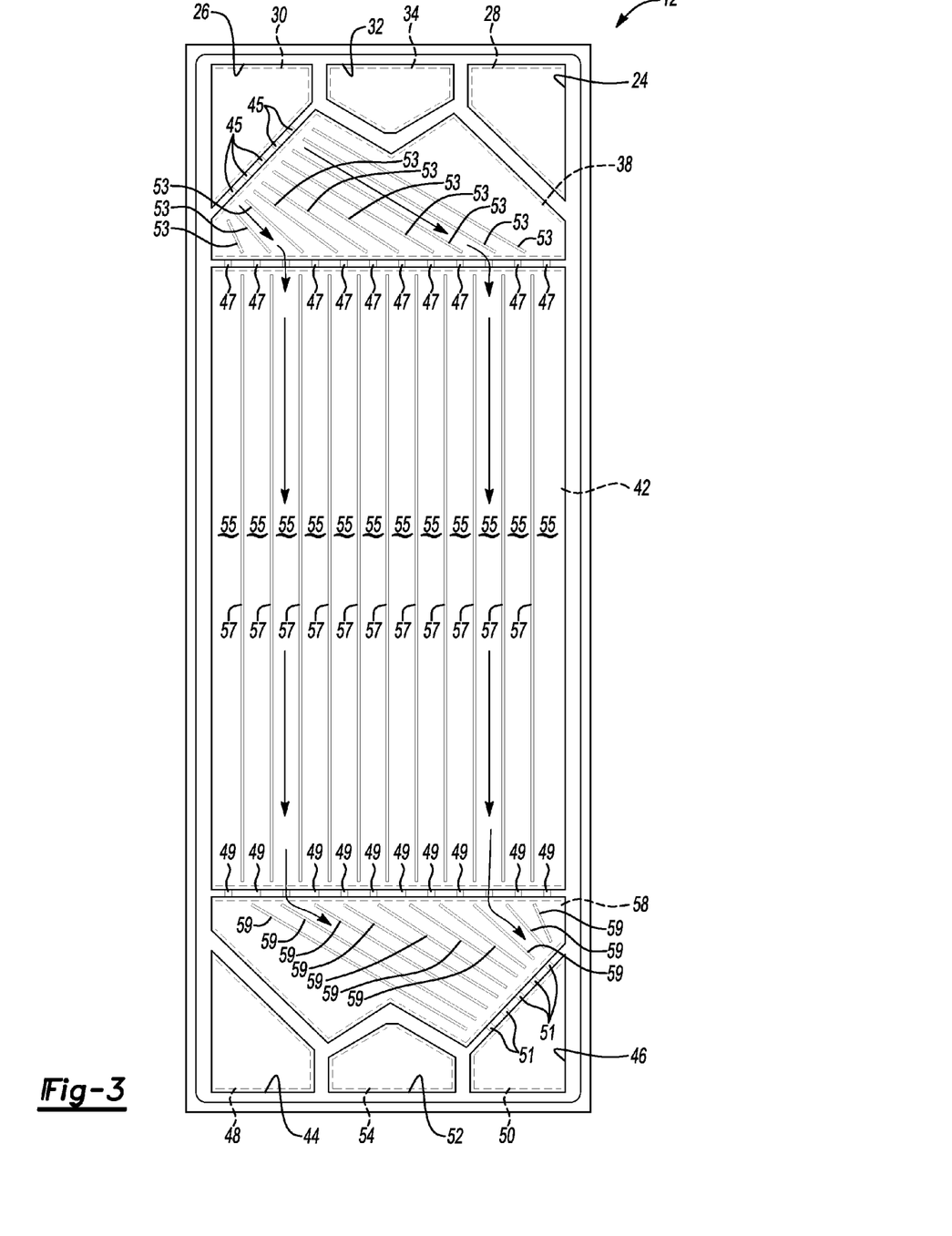
FIG. 3 is a rear view of the bipolar fuel cell plate of FIG. 2.

Referring to FIGS. 2 and 3, a bipolar fuel cell plate 12 may include inlet header surfaces 24, 26 defining, respectively, fluid passageways 28, 30, inlet coolant surface 32 defining coolant passageway 34, inlet transition areas 36, 38, and active areas 40, 42. The bipolar fuel cell plate 12 may also include outlet header surfaces 44, 46 defining, respectively, passageways 48, 50, outlet coolant surface 52 defining coolant passageway 54, and outlet transition areas 56, 58. Any suitable/known plate arrangement, however, may be used.

A gas, such as hydrogen, may flow through the fluid passageway 28 (which is in fluid communication with an inlet port of the end plate 14 of FIG. 1) and enter the inlet transition area 36 via feed passageways 37 that fluidly connect the fluid passageway 28 and the inlet transition area 36. The inlet transition area 36, as known in the art, distributes the hydrogen across the plate 12 via walls 29 prior to entering the active area 40 by way of openings 39 that fluidly connect the inlet transition area 36 and active area 40. (Hydrogen within the active area 40 may then travel along channels 31 defined by walls 33.)

Hydrogen may exit the active area 40 by way of openings 41 that fluidly connect the active area 40 and the outlet transition area 56. The outlet transition area 56, as known in the art, directs the hydrogen via walls 35 toward return passageways 43 that fluidly connect the outlet transition area 56 and fluid passageway 48 (which is in fluid communication with an outlet port of the end plate 14 of FIG. 1).

Air may flow through the fluid passageway 30 (which is in fluid communication with an inlet port of the end plate 14 of FIG. 1) and enter the inlet transition area 38 via feed passageways 45 that fluidly connect the fluid passageway 30 and the inlet transition area 38. The inlet transition area 38 distributes the air across the plate 12 via walls 53 prior to entering the active area 42 by way of openings 47 that fluidly connect the inlet transition area 38 and active area 42. (Air within the active area 42 may then travel along channels 55 defined by walls 57.)

Air may exit the active area 42 by way of openings 49 that fluidly connect the active area 42 and the outlet transition area 58. The outlet transition area 58 directs the air via walls 59 toward return passageways 51 that fluidly connect the outlet transition area 58 and fluid passageway 50 (which is in fluid communication with an outlet port of the end plate 14 of FIG. 1).

A coolant, such as water, may flow through the fluid passageway 34 (which is in fluid communication with an inlet port of the end plate 14 of FIG. 1) and enter a gap (not shown) within the bipolar fuel cell plate 12. This gap separates the transition areas 36, 56 and active area 40 from the transition areas 38, 58 and active area 42 by way of openings (not shown) that fluidly connect the fluid passageway 34 and this gap. Water may exit the gap by way of openings (not shown) that fluidly connect the gap and the fluid passageway 54 (which is in fluid communication with an outlet port of the end plate 14 of FIG. 1).

Figure 4:
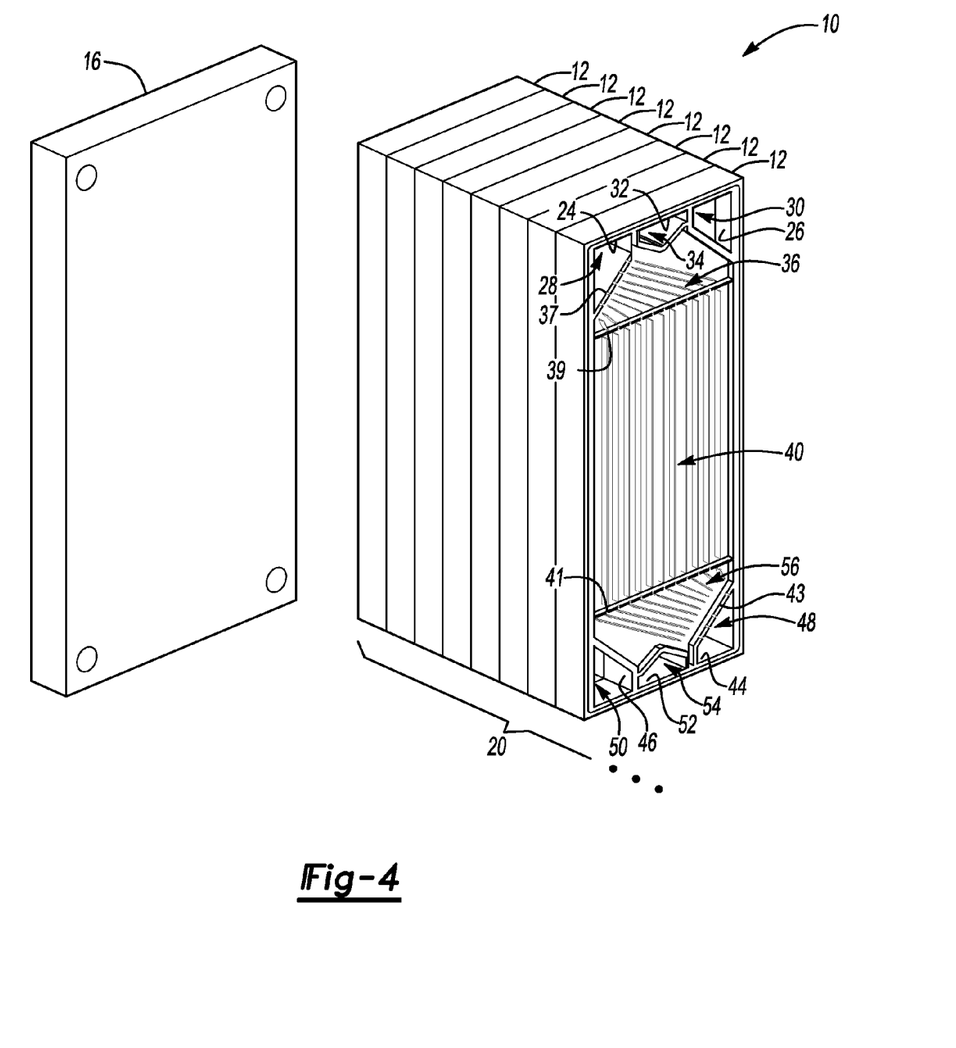
FIG. 4 is an exploded assembly view of a portion of the fuel cell assembly of FIG. 1.

Referring to FIG. 4, a portion of the fuel cell assembly 10 is shown exploded. As apparent to those of ordinary skill, the fluid passageways 28, 30 associated with each of the plates 12 collectively form respective inlet headers (defined, respectively, by the inlet header surfaces 24, 26 of each of the plates 12). Likewise, the fluid passageways 48, 50 associated with each of the plates 12 collectively form respective outlet headers (defined, respectively, by the outlet header surfaces 44, 46 of each of the plates 12). Similarly, (i) the inlet transition areas 36 of each of the plates 12 may collectively define an inlet (hydrogen) transition area of the fuel cell stack 20, (ii) the inlet transition areas 38 of each of the plates 12 may collectively define an inlet (air) transition area of the fuel cell stack 20, (iii) the active areas 40 of each of the plates 12 may collectively define an active (hydrogen) area of the fuel cell stack 20, and (iv) the active areas 42 of each of the plates 12 may collectively define an active (air) area of the fuel cell stack 20, etc.

As mentioned above, the pressure within, for example, the fluid passageway 28 may be higher the closer the bipolar fuel cell plate 12 is positioned relative to the hydrogen inlet port of the end plate 14 (FIG. 1). The pressure within the fluid passageway 28 may be lower the further away the bipolar fuel cell plate 12 is positioned relative to the hydrogen inlet port of the end plate 14. The same may be true for the pressures within the fluid passageways 30.

This plate to plate difference in pressure gradients within the inlet headers that may depend on where the plate 12 is located relative to the inlet ports of the end plate 14 (FIG. 1) may result in non-uniform gas flow through the active areas 40, 42 along the length of the fuel cell stack 20. That is, the active areas 40, 42 of the plates 12 located proximate to the end plate 14 may have gas flow velocities that are greater than those of the active areas 40, 42 of the plates 12 located proximate to the end plate 16.

To create more uniform gas flow through active areas of a fuel cell stack, the size and/or number of feed passageways for a particular bipolar plate may depend on where that plate is located relative to the inlet side of the fuel cell stack. As example, the feed passageways of bipolar plates disposed proximate to the inlet side of the fuel cell stack may have a diameter that is less than the diameter of the feed passageways of bipolar plates disposed proximate to the non-inlet side of the fuel cell stack (to restrict flow near the inlet side relative to flow away from the inlet side). As another example, the feed passageways of bipolar plates disposed proximate to the inlet side of the fuel cell stack may be fewer in number than the feed passageways of bipolar plates disposed proximate to the non-inlet side of the fuel cell stack (again to restrict flow near the inlet side relative to flow away from the inlet side). Of course, combinations of fewer feed passageways and smaller feed passageway diameters may also be used.

Manufacturing and/or design techniques may be used to assist in assembling such plates into a single fuel cell stack. For example, plates having differing feed passageway characteristics may have different location pin diameters. Plates having a fewer number of feed passageways may have a smaller location pin diameter relative to plates having a greater number of feed passageways. An assembly fixture with corresponding dowel diameters coinciding with appropriate zones may then be used to assemble the stack.

Figure 5:
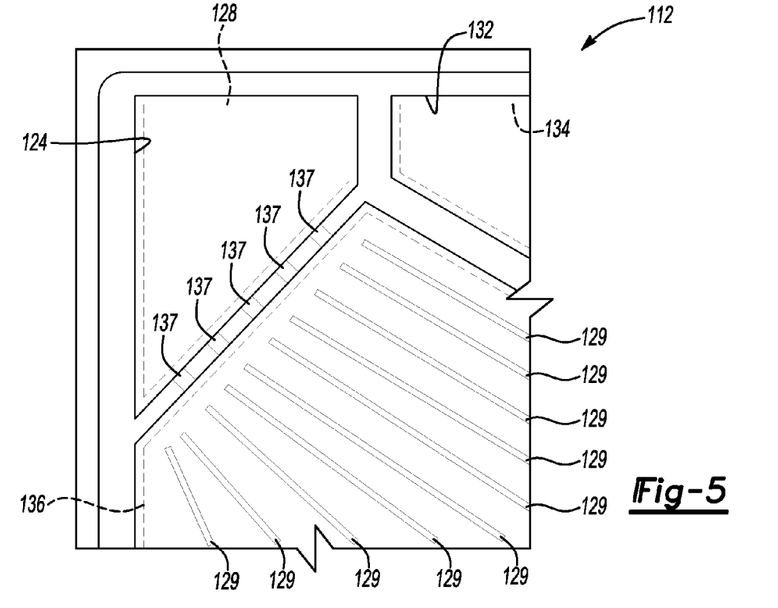
FIGS. 5 and 6 are enlarged views of portions of an embodiment of a bipolar fuel cell plate.
Figure 6:
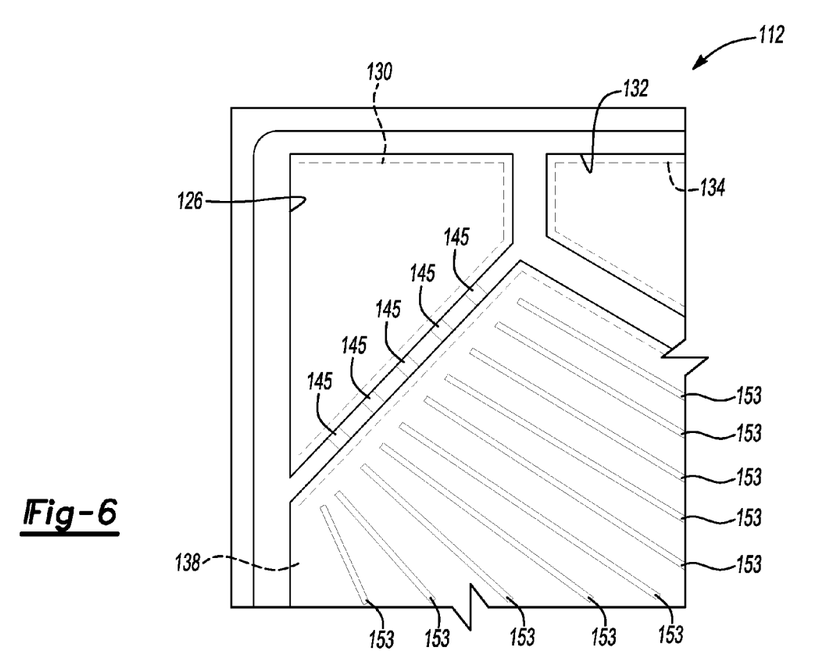
Figure 7:
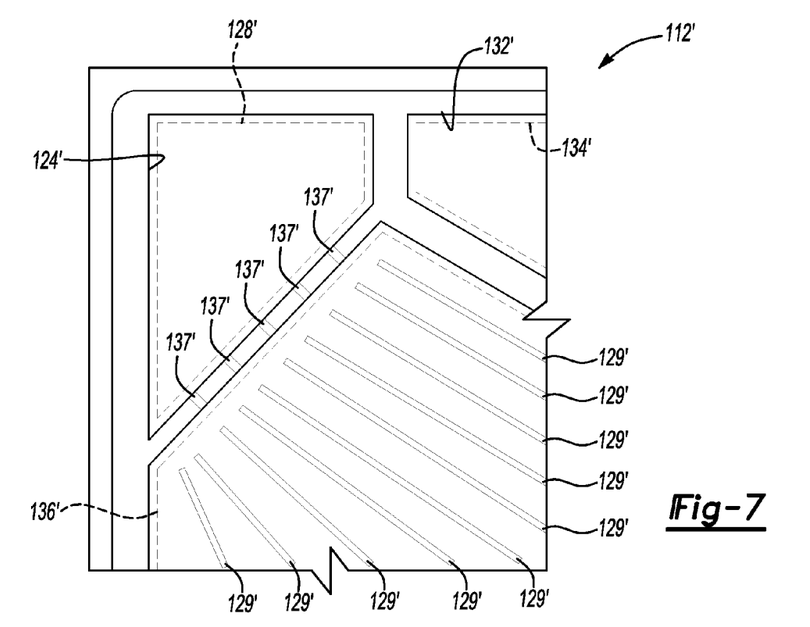
FIGS. 7 and 8 are enlarged views of portions of another embodiment of a bipolar fuel cell plate.
Figure 8:
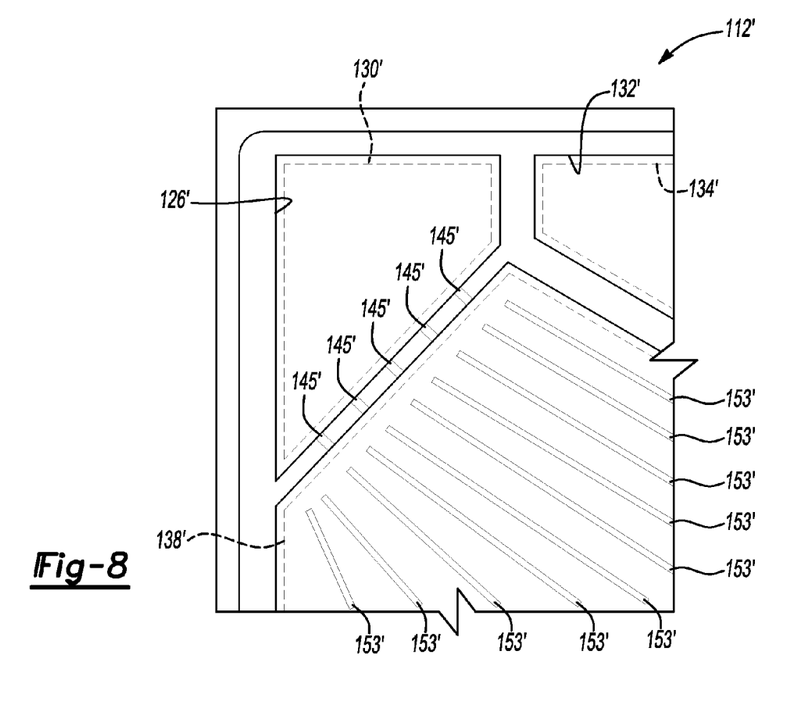

Referring to FIGS. 5 and 6, the feed passageways 137, 145 in the embodiment of the fuel cell plate 112 have a nominal diameter of 3.7 mm. Referring to FIGS. 7 and 8, the feed passageways 137', 145' in the embodiment of the fuel cell plate 112' have a nominal diameter that is approximately, for example, 30% less than the nominal diameter of the feed passageways 137, 145. Any suitable nominal diameter size (and difference in diameter size), however, may be used. In other embodiments, the feed passageways 137, 137' may differ in size while the feed passageways 145, 145' may be the same, etc.

FIG. 5 further illustrates inlet head surface 124, fluid passageway 128, walls 129, inlet coolant surface 132, coolant passageway 134, and transition area 136. FIG. 6 further illustrates inlet header surface 126, fluid passageway 130, transition area 138, and walls 153. FIG. 7 further illustrates inlet header surface 124', fluid passageway 128', walls 129', inlet coolant surface 132', coolant passageway 134', and transition area 136'. FIG. 8 further illustrates inlet header surface 126', fluid passageway 130', transition area 138', and walls 153'.

Figure 9:
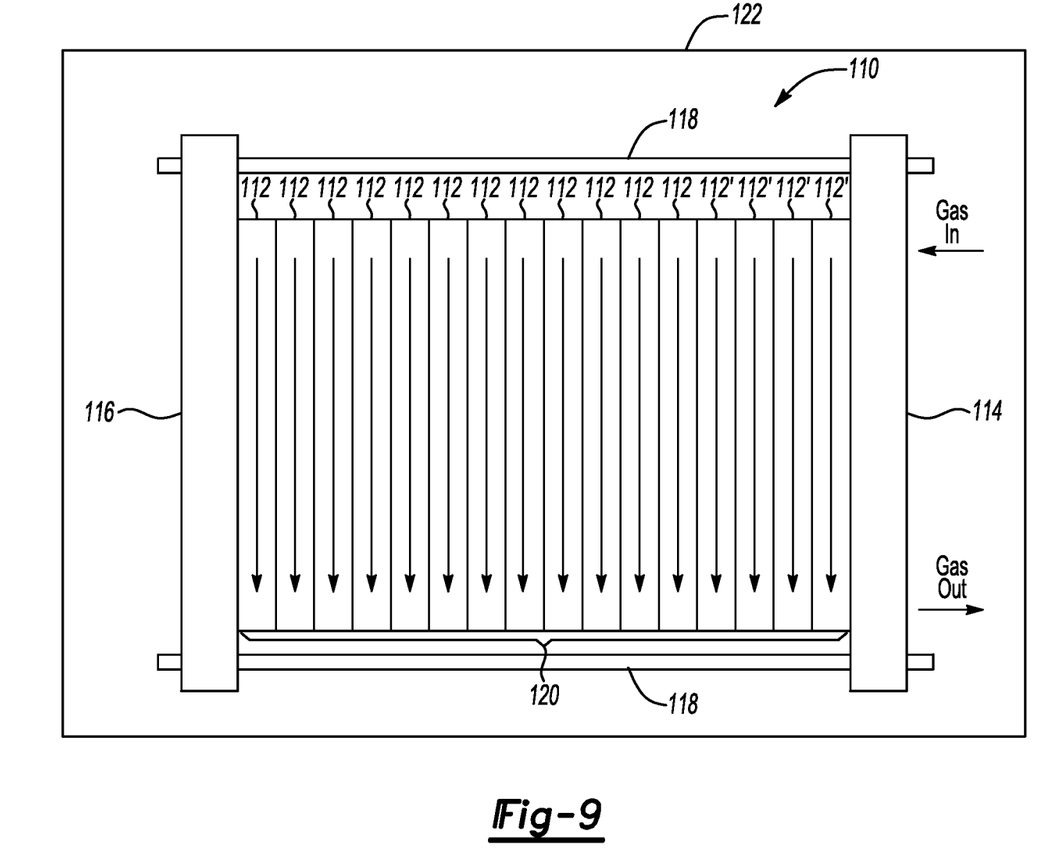
FIG. 9 is a side view of an embodiment of a fuel cell assembly.

Referring to FIG. 9, the bipolar plates 112, 112' may be stacked to form the fuel cell stack 120. The bipolar plates 112 are positioned near the end plate 116 while the bipolar plates 112' (the plates having the smaller feed passageways) are positioned near the end plate 114 (the end plate including the inlet ports). Testing, simulation, design considerations, etc. may determine what portion of the bipolar plates within a fuel cell stack should have the larger feed passageways as opposed to the smaller feed passageways.

This arrangement promotes generally uniform gas flow velocities through the active area of the fuel cell stack 120 along the length of the fuel cell stack 120 by restricting the flow of gas into that portion of the active area near the end plate 114 relative to the flow of gas into that portion of the active area away from the end plate 114.

FIG. 9 further illustrates fuel cell assembly 110, clamps 118, and vehicle 122.

Figure 10:
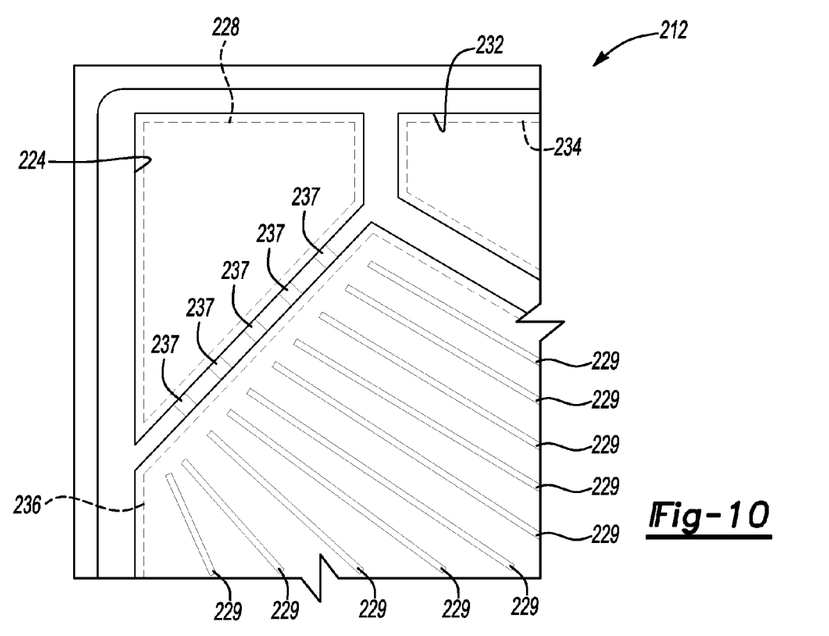
FIGS. 10 and 11 are enlarged views of portions of yet another embodiment of a bipolar fuel cell plate.
Figure 11:
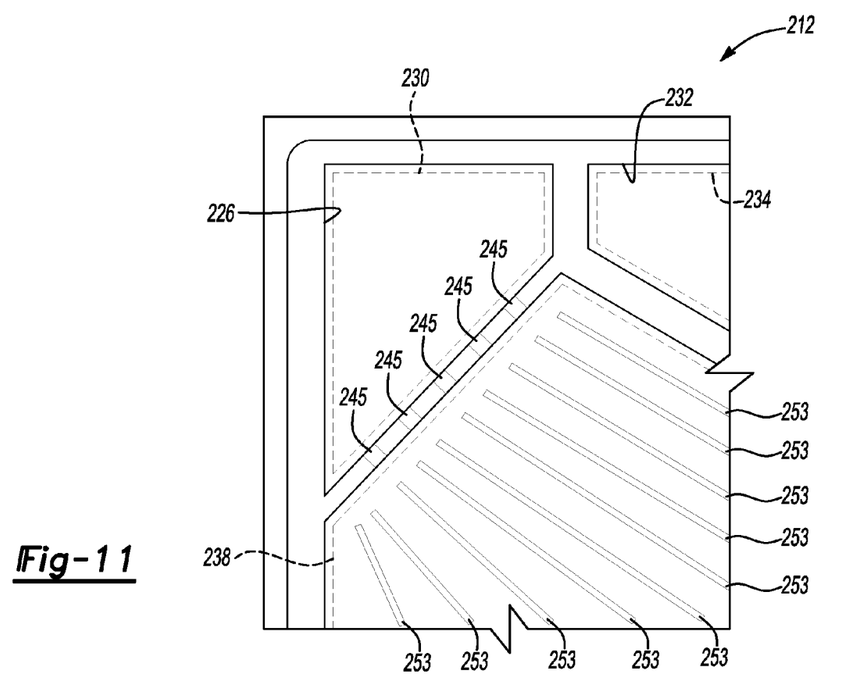
Figure 12:
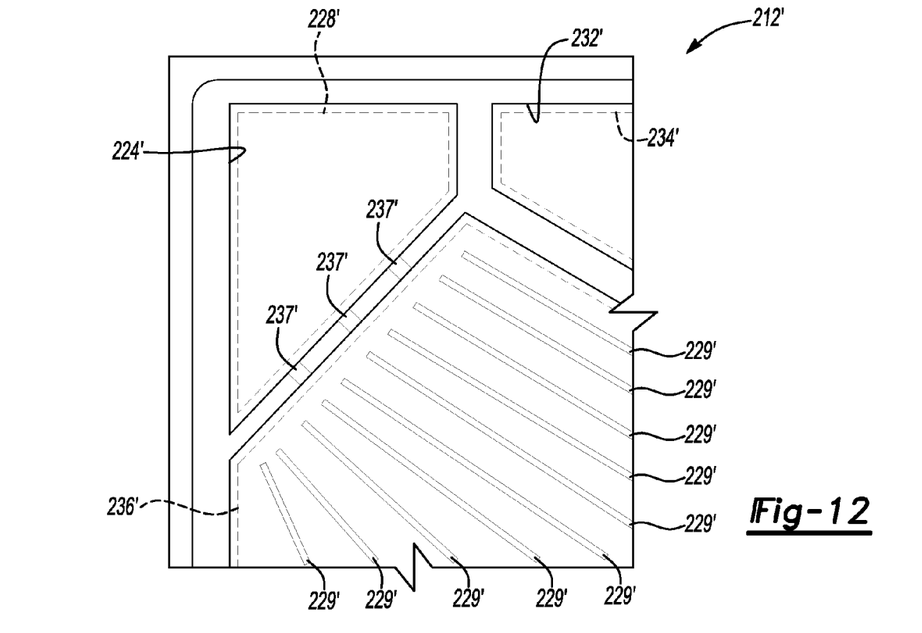
FIGS. 12 and 13 are enlarged views of portions of still yet another embodiment of a bipolar fuel cell plate.
Figure 13:
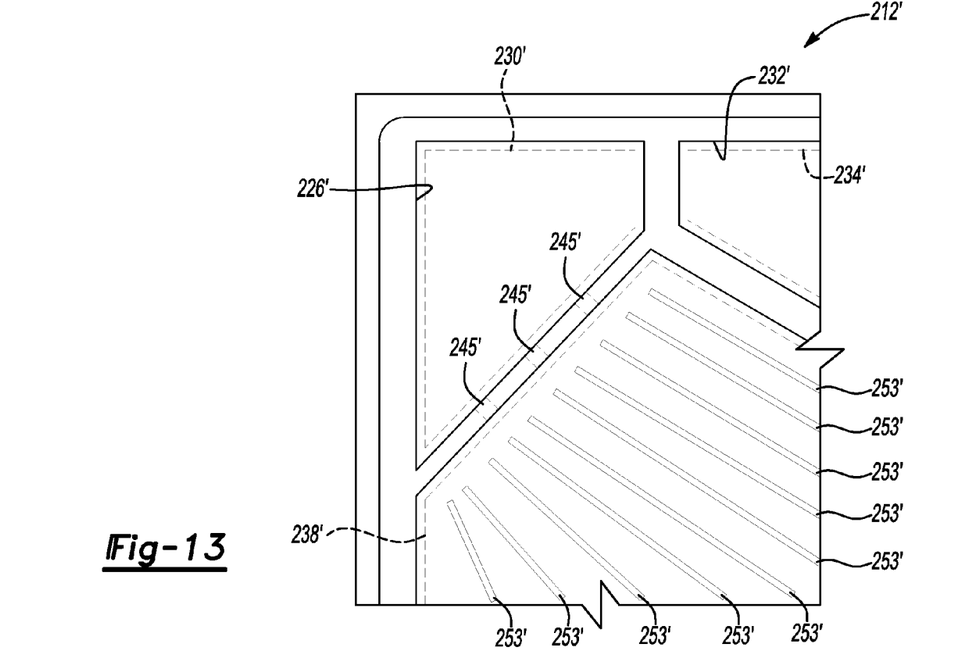

Referring to FIGS. 10 and 11, there are five (5) feed passageways 237 and five (5) feed passageways 245 in the embodiment of the fuel cell plate 212. Referring to FIGS. 12 and 13, there are three (3) feed passageways 237' and three (3) feed passageways 245' in the embodiment of the fuel cell plate 212'. Any suitable number of feed passageways, however, may be used. In other embodiments, the feed passageways 237, 237' may differ in number while the feed passageways 245, 245' may be the same in number, etc.

FIG. 10 further illustrates inlet header surface 224, fluid passageway 228, walls 229, inlet coolant surface 232, coolant passageway 234, and transition area 236. FIG. 11 further illustrates inlet header surface 226, fluid passageway 230, transition area 238, and walls 253. FIG. 12 further illustrates inlet header surface 224', fluid passageway 228', walls 229', inlet coolant surface 232', coolant passageway 234', and transition area 236'. FIG. 13 further illustrates inlet header surface 226', fluid passageway 230', transition area 238', and walls 253'.

Figure 14:
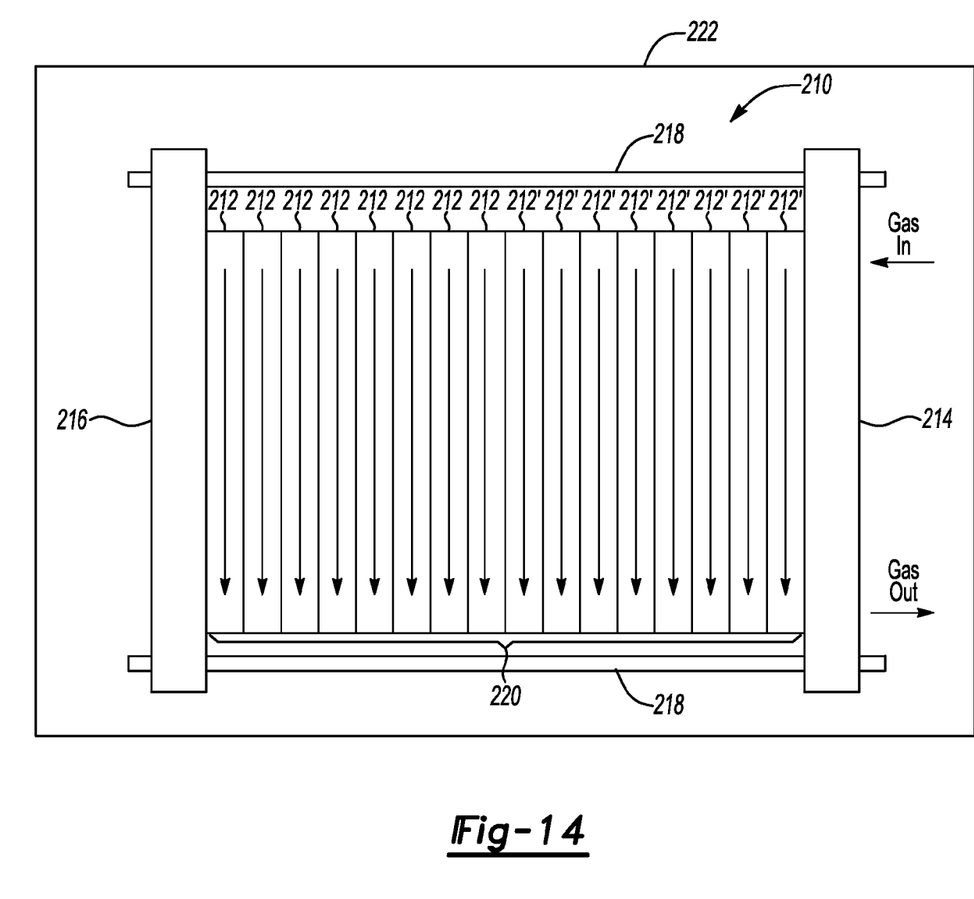
FIG. 14 is a side view of another embodiment of a fuel cell assembly.

Referring to FIG. 14, the bipolar plates 212, 212' may be stacked to form the fuel cell stack 220. The bipolar plates 212 are positioned near the end plate 216 while the bipolar plates 212' (the plates having the fewer number of feed passageways) are positioned near the end plate 214 (the end plate including the inlet ports). Testing, simulation, design considerations, etc. may determine what portion of the bipolar plates within a fuel cell stack should have the greater number of feed passageways as opposed to the lesser number of feed passageways.

This arrangement also promotes generally uniform gas flow velocities through the active area of the fuel cell stack 220 along the length of the fuel cell stack 220 by restricting the flow of gas into that portion of the active area near the end plate 214 relative to the flow of gas into that portion of the active area away from the end plate 214.

FIG. 14 further illustrates fuel cell assembly 210, clamps 218, and vehicle 222.

The gas velocity versus plate number from inlet was analyzed using computational fluid dynamic techniques for fuel cell assemblies similar to those described herein. In a first simulation, the fuel cell assembly analyzed was similar to that described with reference to FIGS. 1 through 4. In a second simulation, the fuel cell assembly analyzed was similar to that described with reference to FIGS. 5 through 9.

Figure 15:
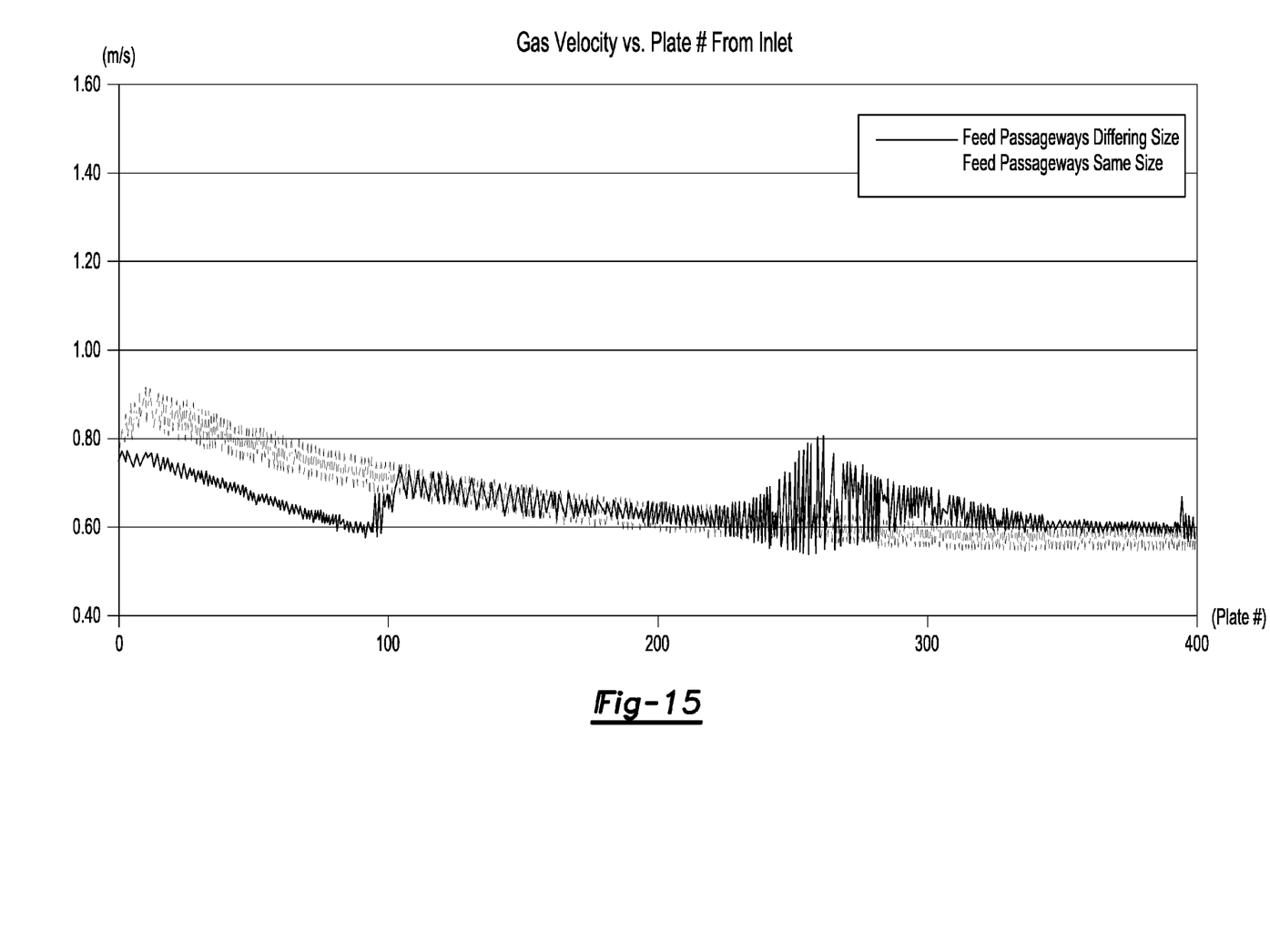
FIG. 15 is an example plot of gas velocity versus plate number from inlet for fuel cell assemblies with and without feed passageways of differing size.

Referring to FIG. 15, a comparison of the gas velocity versus plate number from inlet is depicted for the simulations. The introduction of feed passageways of differing size appears to reduce the variation in gas velocity through the active area along the fuel cell assembly relative to circumstances where the feed passageways are all the same size. For example, the standard deviation in velocity distribution dropped from 0.087 m/s (for the fuel cell assembly with feed passageways all of the same size) to 0.047 m/s (for the fuel cell assembly with feed passageways of differing size).

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A power generating system comprising:
a plurality of bipolar plates stacked to form a fuel cell assembly having an inlet side and a non-inlet side, wherein each of the plates includes (i) a surface defining a portion of a fuel cell assembly inlet header extending from the inlet side of the fuel cell assembly to the non-inlet side of the fuel cell assembly and passing through each of the plates, (ii) an active area, (iii) feed passageways, and (iv) an inlet transition area in fluid communication with the active area and the fuel cell assembly inlet header via the feed passageways, and wherein the feed passageways of the plates located proximate to the inlet side of the fuel cell assembly are generally smaller than the feed passageways of the plates proximate to the non-inlet side of the fuel cell assembly such that, during operation of the fuel cell assembly, flow velocities of gas through the active areas are generally equal.

2. The system of claim 1 wherein the feed passageways of the plates located proximate to the inlet side have a diameter that is at least 20% less than the diameter of the feed passageways of the plates located proximate to the non-inlet side.

3. The system of claim 1 wherein the number of the feed passageways formed in each of the plates located proximate to the inlet side is less than the number of the feed passageways formed in each of the plates located proximate to the non-inlet side.

4. The system of claim 3 wherein the number of the feed passageways formed in each of the plates located proximate to the inlet side is at least 20% less than the number of the feed passageways formed in each of the plates located proximate to the non-inlet side.

5. A power generating system comprising:
a plurality of bipolar plates stacked to form a fuel cell assembly having an inlet side and a non-inlet side, wherein each of the plates includes (i) a surface defining a portion of a fuel cell assembly inlet header extending from the inlet side of the fuel cell assembly to the non-inlet side of the fuel cell assembly and passing through each of the plates, (ii) an active area, (iii) feed passageways formed therein, and (iv) an inlet transition area in fluid communication with the active area and the fuel cell assembly inlet header via the feed passageways, and wherein the number of the feed passageways formed in each of the plates located proximate to the inlet side of the fuel cell assembly is less than the number of the feed passageways formed in each of the plates located proximate to the non-inlet of the fuel cell assembly side such that, during operation of the fuel cell assembly, flow velocities of gas through the active areas are generally equal.

6. The system of claim 5 wherein the number of the feed passageways formed in each of the plates located proximate to the inlet side is at least 20% less than the number of the feed passageways formed in each of the plates located proximate to the non-inlet side.

7. The system of claim 5 wherein the feed passageways of the plates located proximate to the inlet side are generally smaller than the feed passageways of the plates located proximate to the non-inlet side.

8. The system of claim 7 wherein the feed passageways of the plates located proximate to the inlet side have a diameter that is at least 20% less than the diameter of the feed passageways of the plates located proximate to the non-inlet side.

9. An automotive vehicle comprising:
a fuel cell system configured to provide power to move the vehicle and including a plurality of bipolar plates stacked to form a fuel cell assembly having an inlet side and a non-inlet side, wherein each of the plates includes (i) a surface defining a portion of a fuel cell assembly inlet header extending from the inlet side of the fuel cell assembly to the non-inlet side of the fuel cell assembly and passing through each of the plates, (ii) feed passageways formed therein, and (iii) an inlet transition area in fluid communication with the fuel cell assembly inlet header via the feed passageways, and wherein the feed passageways of the plates located proximate to the inlet side of the fuel cell assembly are configured to restrict the flow of gas therethrough, during operation of the fuel cell assembly, relative to the flow of gas through the feed passageways of the plates located proximate to the non-inlet side.

10. The vehicle of claim 9 wherein each of the plates further includes an active area in fluid communication with the inlet transition area and wherein the feed passageways of the plates located proximate to the inlet side are configured to restrict the flow of gas therethrough, during operation of the fuel cell assembly, relative to the flow of gas through the feed passageways of the plates located proximate to the non-inlet side such that flow velocities of gas through the active areas are generally equal.

11. The vehicle of claim 9 wherein the feed passageways of the plates located proximate to the inlet side are generally smaller than the feed passageways of the plates located proximate to the non-inlet side.

12. The vehicle of claim 11 wherein the feed passageways of the plates located proximate to the inlet side have a diameter that is at least 20% less than the diameter of the feed passageways of the plates located proximate to the non-inlet side.

13. The vehicle of claim 9 wherein the number of the feed passageways formed in each of the plates located proximate to the inlet side is less than the number of the feed passageways formed in each of the plates located proximate to the non-inlet side.

14. The vehicle of claim 13 wherein the number of the feed passageways formed in each of the plates located proximate to the inlet side is at least 20% less than the number of the feed passageways formed in each of the plates located proximate to the non-inlet side.

* * * * *